United States Patent
Tachibana et al.

(10) Patent No.: US 9,751,142 B2
(45) Date of Patent: Sep. 5, 2017

(54) HIGH-FREQUENCY-VIBRATION-ASSISTED ELECTROLYTIC GRINDING METHOD AND DEVICE THEREFOR

(71) Applicant: Micron Machinery Co., LTD, Yamagata (JP)

(72) Inventors: Toru Tachibana, Yamagata (JP); Satoshi Kobayashi, Yamagata (JP); Masayuki Takahashi, Yamagata (JP); Chikashi Murakoshi, Yamagata (JP); Kazunori Koike, Yamagata (JP)

(73) Assignee: MICRON MACHINERY CO., LTD, Yamagata (JP)

( * ) Notice: Subject to any disclaimer, the term of this patent is extended or adjusted under 35 U.S.C. 154(b) by 295 days.

(21) Appl. No.: 14/400,482

(22) PCT Filed: Apr. 12, 2013

(86) PCT No.: PCT/JP2013/002519
§ 371 (c)(1),
(2) Date: Nov. 11, 2014

(87) PCT Pub. No.: WO2014/010152
PCT Pub. Date: Jan. 16, 2014

(65) Prior Publication Data
US 2015/0231718 A1    Aug. 20, 2015

(30) Foreign Application Priority Data
Jul. 11, 2012    (JP) .................................. 2012-155396

(51) Int. Cl.
*B23H 5/08*    (2006.01)
*C25F 3/02*    (2006.01)
*C25F 7/00*    (2006.01)

(52) U.S. Cl.
CPC ................. *B23H 5/08* (2013.01); *C25F 3/02* (2013.01); *C25F 7/00* (2013.01)

(58) Field of Classification Search
CPC ...................................................... B23H 5/08
See application file for complete search history.

(56) References Cited

FOREIGN PATENT DOCUMENTS

JP        03234451        10/1991
JP        03234451 A   *  10/1991
(Continued)

OTHER PUBLICATIONS

SandPaper, http://web.archive.org/web/20111014064612/http://en.wikipedia.org/wiki/Sandpaper; Oct. 14, 2011.*

*Primary Examiner* — Nicholas A Smith
(74) *Attorney, Agent, or Firm* — Bryant J. Keller; Kirton McConkie

(57) ABSTRACT

To provide a high-frequency-vibration-assisted electrolytic grinding method and a device therefor in which micro abrasive grains can be used so as to improve the grinding accuracy and efficiency. A high-frequency-vibration-assisted electrolytic grinding method in which a work is grinded by a grinding stone while electrolytic reaction is performed by applying a voltage between the grinding stone and the work through an electrolytic solution and high-frequency vibration is transmitted to the grinding stone or the work wherein; the grinding stone has non-conductive micro abrasive grains with grain sizes of less than #400 in accordance with the JIS R6001 standard of grinding stones for precision polishing projecting from its surface formed of conductive binding material, and the distance between the grinding stone and the work, which is regulated by the projecting lengths of the micro abrasive grains from the base of the grinding stone, is set to less than 0.02 mm.

13 Claims, 9 Drawing Sheets

(56) References Cited

FOREIGN PATENT DOCUMENTS

| JP | 03251317 | | 11/1991 |
|---|---|---|---|
| JP | 03251317 A | * | 11/1991 |
| JP | 2004358585 | | 12/2004 |

* cited by examiner

| No. | condition of pulse power | | | | occurrence of electrolysis |
|---|---|---|---|---|---|
| | voltage applied | DUTY ratio (%) | ON-Time($\mu$s) | OFF-Time($\mu$s) | |
| 1 | low | 91% | 10 | 1 | × |
| 2 | mid. | 50% | 1 | 1 | × |
| 3 | high | 17% | 1 | 5 | ○ | average current between electrodes 2A

Fig. 7

HIGH-FREQUENCY-VIBRATION-ASSISTED ELECTROLYTIC GRINDING METHOD AND DEVICE THEREFOR

TECHNICAL FIELD

The present invention relates to an electrolytic grinding device in which a work is grinded by a grinding stone while electrolytic reaction is performed by applying a voltage between the grinding stone and the work through an electrolytic solution and, more specifically, to a high-frequency-vibration-assisted electrolytic grinding method and a device therefor having an improved efficiency of the electrolytic grinding and allowing the work to have a desirable surface roughness by transmitting high-frequency vibration to the grinding stone.

BACKGROUND ART

There have been conventionally proposed an electrolytic grinding device which performs electrolytic grinding on the surface of a work by applying a voltage between the grinding stone and the work through the electrolytic solution.

The electrolytic grinding is a processing technique that combines the elements of grinding (kinetic energy of abrasive grains) and electrolysis (electric energy on the work) in which electrolytic grinding is performed by applying a voltage between the grinding stone and the work through the electrolytic solution.

DISCLOSURE OF THE INVENTION

There has been a problem in the above-described conventional electrolytic grinding device, however, that it cannot improve the surface roughness of the processed works to the desired degree.

This problem has been caused by the restriction that the distance between the electrodes generally must be 0.02 mm or more in an electrolytic grinding device. This is due to the fact that diamond abrasive grains (which are nonconductive) disposed between the base of the grinding stone (which is conductive) and the work (which is conductive) serve as spacers and the projecting lengths of the diamond abrasive grains from the base of the grinding stone regulate the distance between the two electrodes. In case the distance between the two electrodes is less than 0.02 mm, the electrodes are short-circuited to cause the electrolytic reaction to be unstable or to cease.

In case the distance between the electrodes must be 0.02 mm or more, the longitudinal dimension of the abrasive grains must be 0.04 mm or more assuming that at least 50% of the abrasive grains are retained inside the base of the grinding stone. This means that only large-sized abrasive grains having grain sizes of #400 or larger are available in a electrolytic grinding device. The abrasive grains having such grain sizes do not provide adequate grinding accuracy so as to mirror finish the surface of a work and, accordingly, necessitate it to further perform, after the electrolytic grinding process, a finishing process to grind the inner surface using a honing machine.

In consideration of the above problems, it is an object of the present invention to provide a high-frequency-vibration-assisted electrolytic grinding method and a device therefor in which micro abrasive grains can be used so as to improve the grinding accuracy and efficiency.

SUMMARY

As a result of earnest study in consideration of the above problem, the inventors have found that even in case the distance between the electrodes is less than 0.02 mm, where a stable electrolytic reaction did not occur in the conventional device and method, electrolytic reaction can be induced or promoted by transmitting high-frequency vibration to the grinding stone. Thus, a high-frequency-vibration-assisted electrolytic grinding method and a device of the present invention is achieved by thoroughly studying the conditions of the grinding process.

According to the present invention, there is provided a high-frequency-vibration-assisted electrolytic grinding method in which a work is grinded by a grinding stone while electrolytic reaction is performed by applying a voltage between the grinding stone and the work through an electrolytic solution and high-frequency vibration is transmitted to the grinding stone or the work wherein; the grinding stone has non-conductive micro abrasive grains with grain sizes of less than #400 in accordance with the JIS R6001 standard of grinding stones for precision polishing projecting from its surface formed of conductive binding material, and the distance between the grinding stone and the work, which is regulated by the projecting lengths of the micro abrasive grains from the base of the grinding stone, is set to less than 0.02 mm.

In the above method, it is possible to perform electrolytic grinding by transmitting high-frequency vibration to the grinding stone so as to induce or promote electrolytic reaction between the grinding stone and the work even under the condition that the grinding stone retaining micro abrasive grains have projecting lengths of less than 0.02 mm and the distance between the electrodes, i.e. the distance between the base of the grinding stone retaining the abrasive grains and the work, is set to less than 0.02 mm.

The high-frequency-vibration-assisted electrolytic grinding method according to the present invention is further characterized in that a pulse current having a duty ratio of 5 to 50% is applied between the grinding stone and the work such that the average voltage between the electrodes is set between 1 and 10V.

In the above method, it is possible to improve the grinding accuracy by minimizing deterioration of the surface roughness of the work caused by the surface of the work being dissolved to form pits while maintaining the electrolysis inducing action by transmitting high frequency vibration.

According to the present invention, there is provided a high-frequency-vibration-assisted electrolytic grinding device comprising: a grinding stone having non-conductive micro abrasive grains with grain sizes of less than #400 in accordance with the JIS R6001 standard of grinding stones for precision polishing projecting from the surface thereof which is made of conductive binding material; a vibrating means to transmit high-frequency vibration to the grinding stone or a work; and an electrolysis regulating means to perform electrolytic grinding by applying a voltage between the grinding stone and a work through electrolytic solution, wherein electrolytic grinding is performed while transmitting high-frequency vibration to the grinding stone or a work so as to induce or promote electrolytic reaction between the grinding stone and a work under the condition that the distance between the grinding stone and a work, which is regulated by the projecting lengths of the micro abrasive grains from the base of the grinding stone, is set to less than 0.02 mm.

BRIEF DESCRIPTION OF THE DRAWINGS

FIG. 7 is an explanatory view for examining the optimized pulse power supply for inducing electrolytic reaction in the high-frequency-vibration-assisted electrolytic grinding device according to the present invention.

Figure 1:
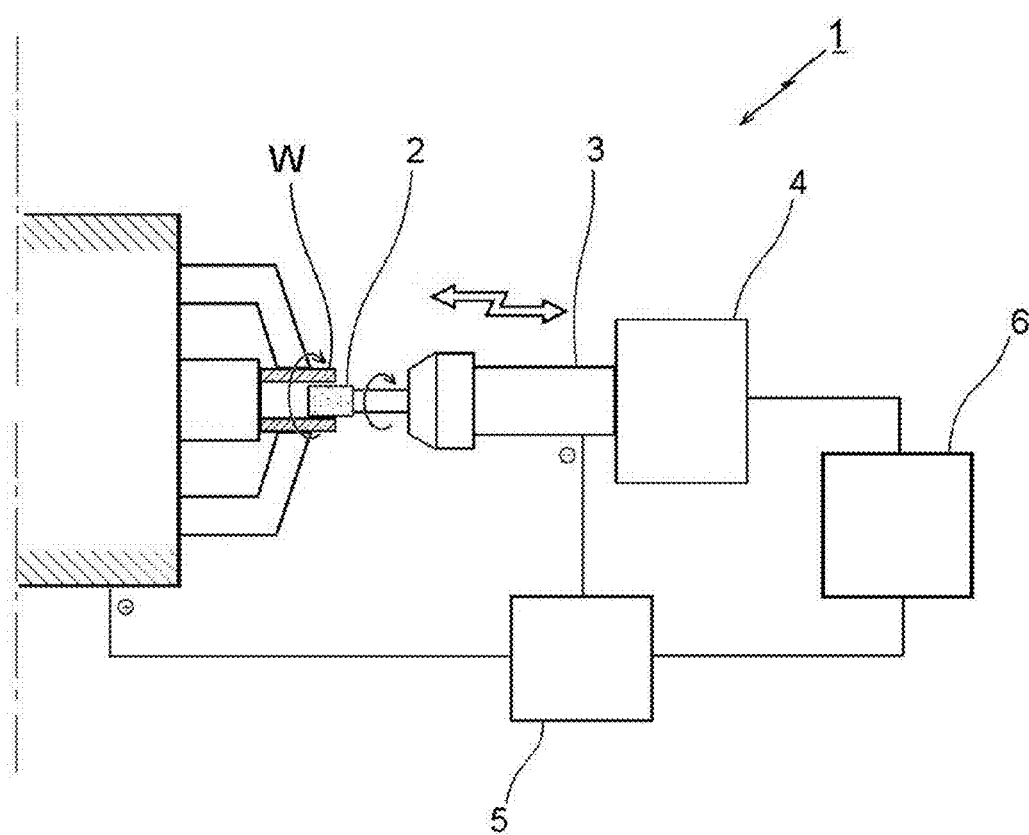
FIG. 1 is an explanatory view showing a high-frequency-vibration-assisted electrolytic grinding device according to the present invention.

Described hereinafter with reference to the attached figures are detailed embodiments for carrying out the high-frequency-vibration-assisted electrolytic grinding device according to the present invention. In the FIGS. 1 to 8 illustrating exemplary embodiments of the present invention, like reference numerals refer to like members which have similar basic composition and operation.

Shown in FIG. 1 is an embodiment of high-frequency-vibration-assisted electrolytic grinding device according to the present invention. The high-frequency-vibration-assisted electrolytic grinding device 1 comprises a grinding stone 2, a grinding stone spindle 3 for rotating the grinding stone 2, a high-frequency-vibrating means 4 for transmitting high frequency vibration (of 20 kHz or more, for example) toward its axial direction, an electrolysis-power supply means 5 for supplying electric power for electrolytic grinding between the grinding stone 2 and a work W and a regulating means 6 for regulating the grinding process performed by the high-frequency-vibrating means 4 and the electrolysis-power supply means 5.

There is also provided a grinding stone axial slide, not shown in the figures, which has the spindle 3 mounted thereon and moves forward and backward in the direction of the axis of the grinding stone. There is also provided a main shaft chucking the work W, not shown in the figures, which moves in the cutting direction.

Figure 2:
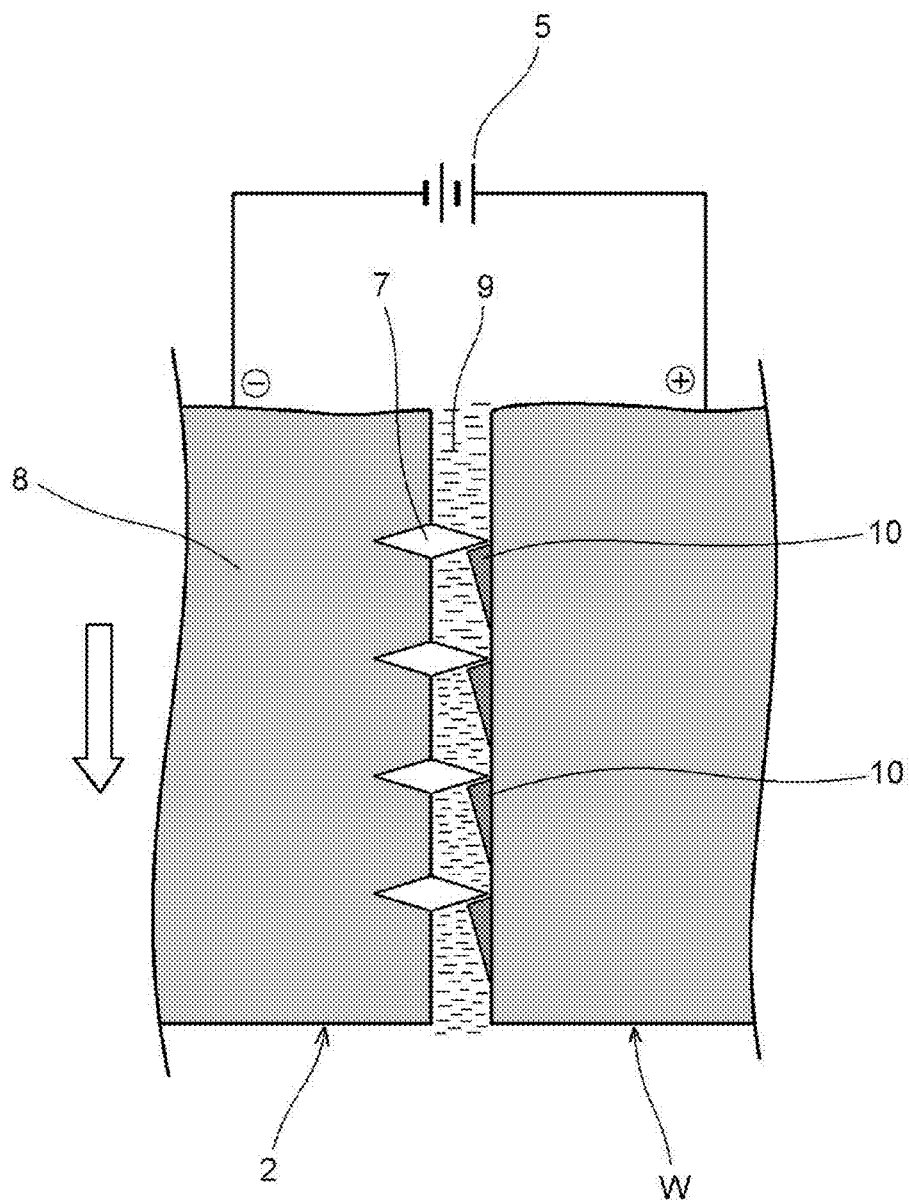
FIG. 2 is an explanatory view showing a grinding process performed in the high-frequency-vibration-assisted electrolytic grinding device according to the present invention.

FIG. 2 schematically illustrates a state where the grinding stone 2 is brought into contact with the work W so as to perform electrolytic grinding. The grinding stone 2 comprises a non-conductive abrasive grains 7, e.g. diamond abrasive grains, fixed thereon by way of conductive binding material 8. When grinding the work W, the projecting length of the abrasive grains 7 from the surface of the grinding stone 2 determines the distance between the electrodes, i.e. the grinding stone 2 and the work W. In this embodiment, the distance between the electrodes can be set to less than 0.02 mm by employing abrasive grains 7 having grain sizes of less than #400 in accordance with the JIS R6001 standard of grinding stones for precision polishing.

The electrolysis-power supply means 5 applies a predetermined voltage between the grinding stone 2 and the work W. As shown in the figure, electrolytic solution is provided between the grinding stone 2 and the work W and electrolytic products 10 are formed by electrolytic reaction.

Below described is a method of high-frequency-vibration-assisted electrolytic grinding of the present invention as described in the above.

In the electrolytic grinding process, it is possible to confirm in the following way that electrolytic reaction is induced by the assistance of high frequency vibration.

—Monitoring of Electrolytic Reaction—

[Processing Condition]

Work and Hardness:
Made of chromium molybdenum steel (SCM), cylindrical shape with inner surface of 4 mm φ, 9 mm length, 58 or more HCR hardness Grinding Stone:
Diamond electrodeposition grinding stone with grain size of #2000 or more Projecting Length of Abrasive Grains:
0.005 mm Rotation Speed of Grinding Stone:
4000 rpm Rotation Speed of Work:
1000 rpm High Frequency Vibration:
51 kHz, 8 $\mu m_{p\text{-}p}$ DUTY Ratio of Pulse Power:
50%

Processing Time:
60 sec

Figure 3:
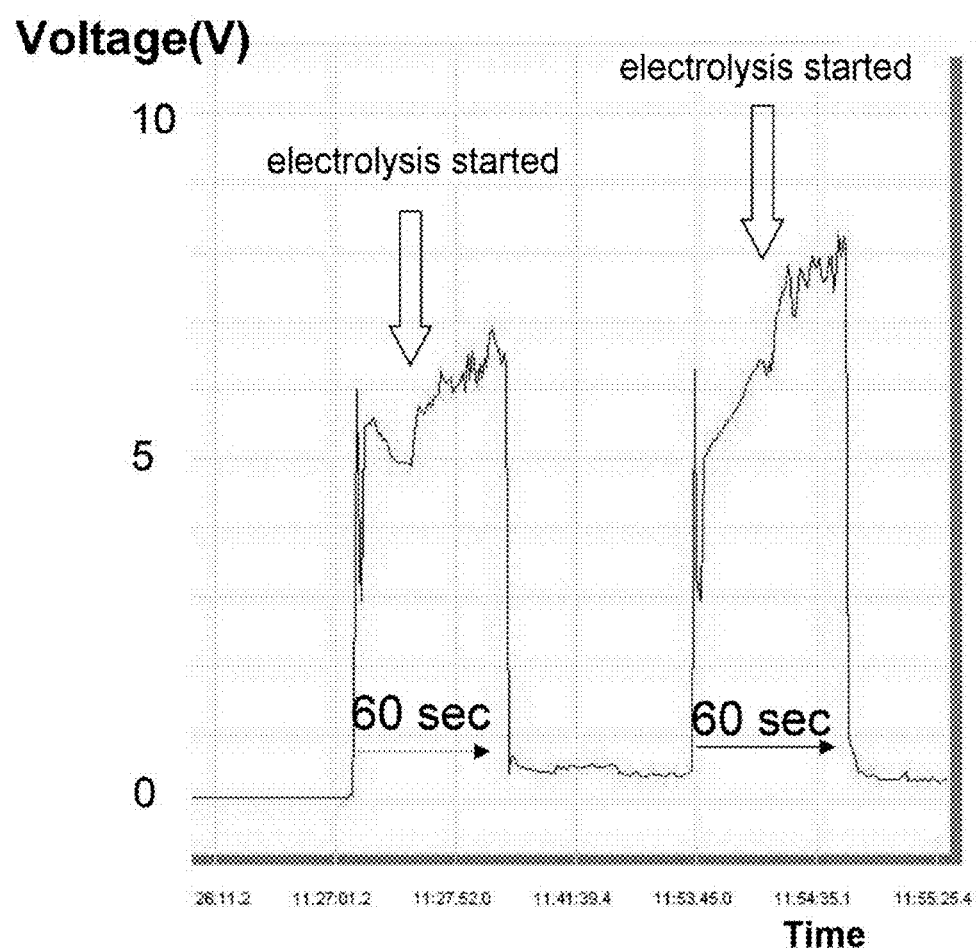
FIG. 3 is a graphical representation showing the change of voltage between the grinding stone and a work in the high-frequency-vibration-assisted electrolytic grinding device according to the present invention.
Figure 4:
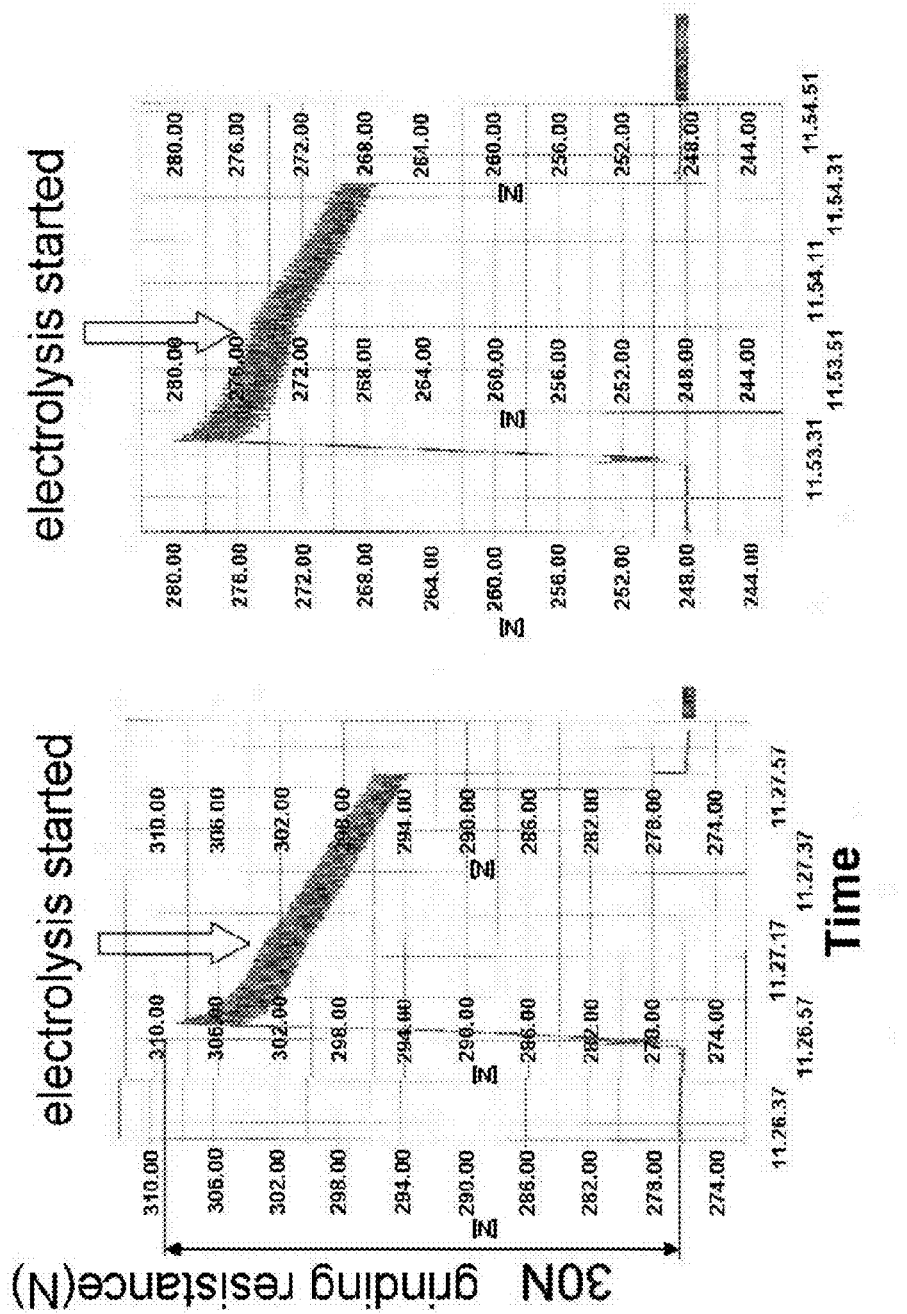
FIG. 4 is a graphical representation showing the grinding resistance during the electrolytic grinding process in the high-frequency-vibration-assisted electrolytic grinding device according to the present invention.

While performing high-frequency-vibration-assisted electrolytic grinding under the above-described condition, change of the voltage between the grinding stone 2 and the work W is measured. In FIG. 3 is shown the result of the measurement. At the same time, the grinding resistance on the grinding stone during the electrolytic grinding process is measured (using a load cell). In FIG. 4 is shown the result of the measurement.

Studying these results of the measurements, it is confirmed that, as shown in FIG. 3, the voltage steeply rises (1) 25 seconds and (2) 30 seconds after the process is initiated and that, as shown in FIG. 4, the grinding resistance decreases at the same time.

This is considered to mean that the points in time where the voltage between the grinding stone 2 and the work W steeply rises correspond to the points of time where electrolytic grinding is initiated. The fact that such steep rise of voltage does not occur without transmitting high frequency vibration to the electrodes suggests that electrolytic reaction is induced by high frequency vibration.

—Condition for Inducing Electrolytic Reaction with High Frequency Vibration—

Figure 5:
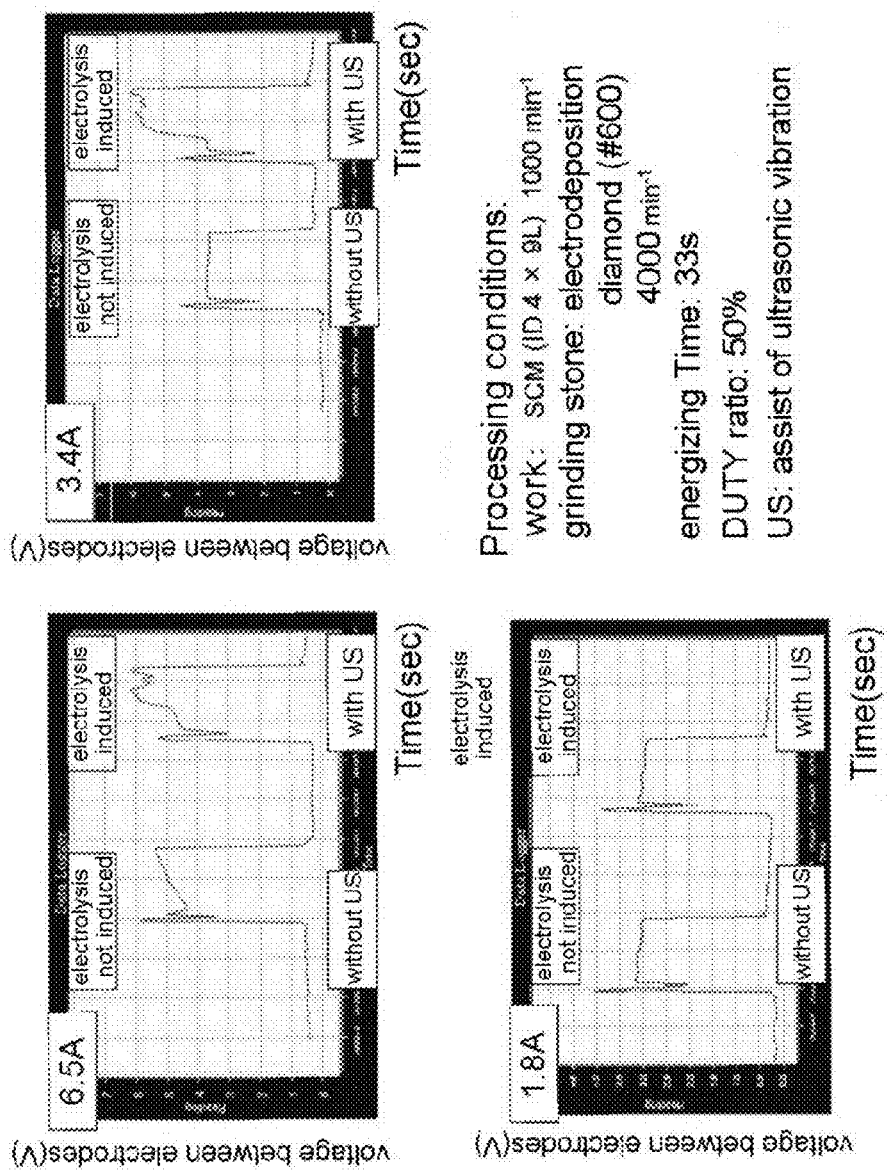
FIG. 5 is an explanatory view showing the relationship of the set current value for electrolytic reaction and the induction of electrolysis in the high-frequency-vibration-assisted electrolytic grinding device according to the present invention.

In order to confirm the threshold value of current for inducing electrolytic reaction, measurements are made under conditions where three different electric power are applied between the grinding stone 2 and the work W through the electrolytic solution, as shown in FIG. 5.

It is observed that in case the currents are 6.5 A and 3.4 A, transmitting high frequency vibration causes steep rise in voltage so as to induce electrolytic reaction and in case the current is 1.8 A, transmitting high frequency vibration does not induce electrolytic reaction. In the latter case, it is confirmed that the amount of removals from the work is significantly low.

Figure 6:
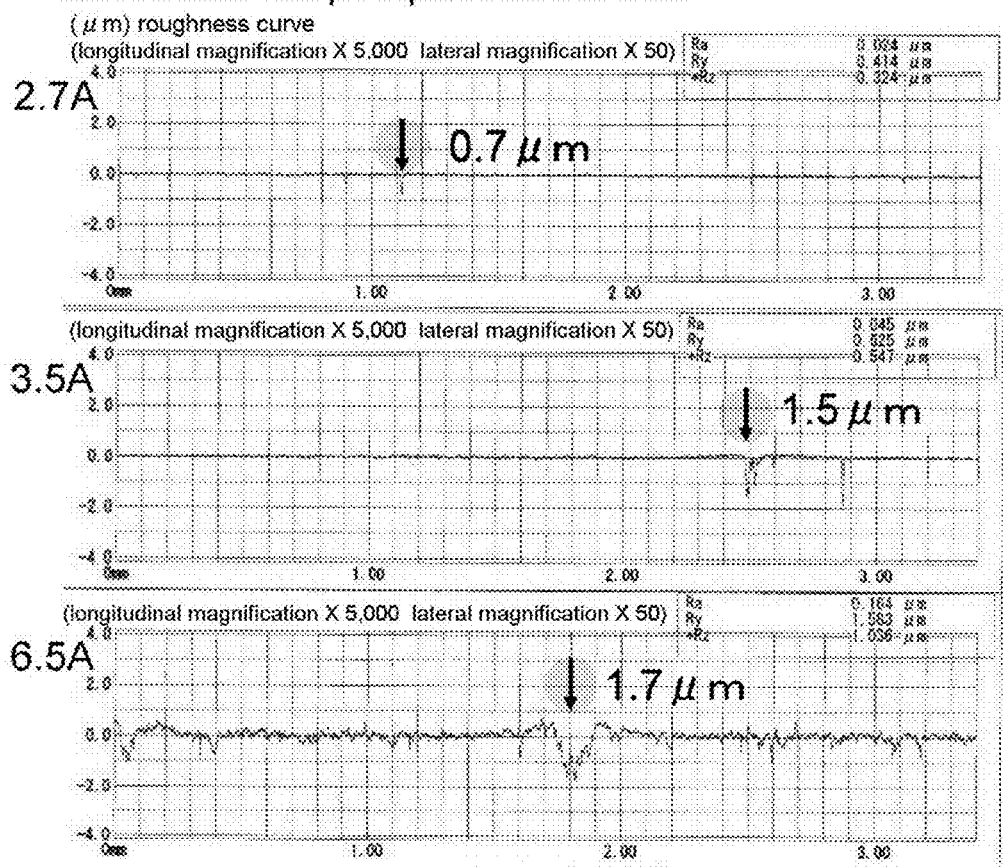
FIG. 6 is an explanatory view showing the relationship of the current density for electrolysis and the surface roughness a work.

FIG. 6 is a graph representation showing the surface roughness of work processed in the above three different conditions of currents. It is required to set high current density in order to improve the efficiency of the process because the amount of electrolysis induced is proportional to the coulomb amount supplied between the grinding stone 2 and the work W. There is yet a problem that, when the current density is high, the surface of the work is dissolved to form pits, which leads to deterioration of the surface roughness of the work.

It is thus required to perform electrolytic grinding with as low current density as possible in order to mirror finish the surface of the work in the high-frequency-vibration-assisted electrolytic grinding.

FIG. 7 illustrates examples for examining optimized settings of the power supply for inducing electrolytic reaction with as low current value as possible. High-frequency-vibration-assisted electrolytic grinding is performed by applying three different pulse powers with the average current of 2 A flowing between the electrodes which is set by adjusting the voltage and the duty ratio.

It is confirmed that electrolytic reaction is induced when the pulse power is set high and the duty ratio is set low. It is thus possible to induce electrolytic reaction with low current.

Figure 8:
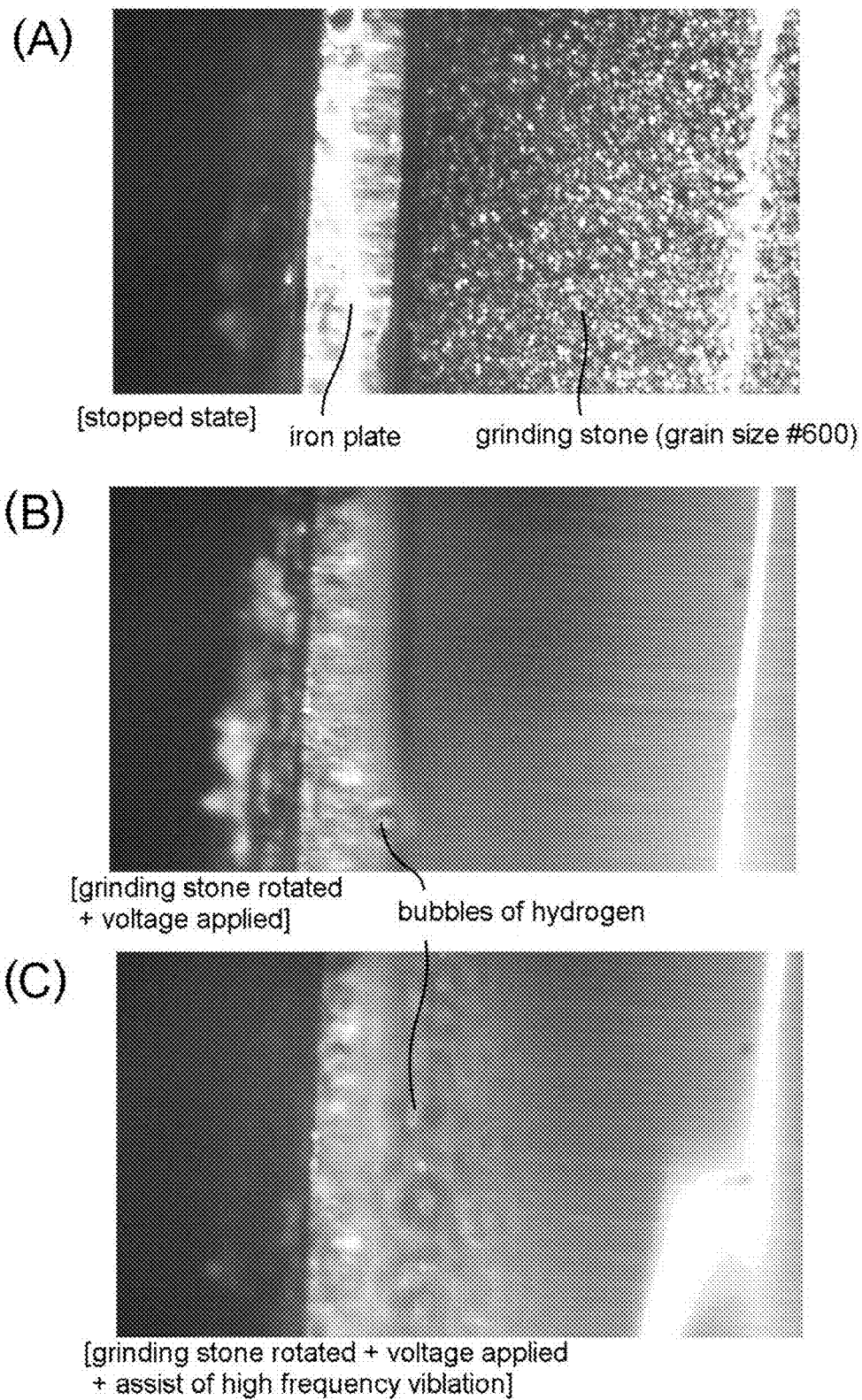
FIG. 8 is an explanatory view showing the actions of a high-frequency-vibration-assisted electrolytic grinding method in which (A) shows a state where the grinding stone and a work are in a stopped state and are in contact with each other, (B) shows a state where the grinding stone is rotated and a voltage is applied between the electrodes and (C) shows a state where high frequency vibration is transmitted to the grinding stone.

FIG. 8 shows photographs of the electrolytic grinding process in the high-frequency-vibration-assisted electrolytic grinding method according to the present invention. The processing conditions are as follows.

Grinding stone: Diamond electrodeposition grinding stone with #600 grain size and 0.01 mm projecting length of abrasive grains Work: Iron plate with 0.05 mm thickness Pulse power:(output): 30V voltage, 1 A current, 50% DUTY ratio (1 μs ON, 1 μs OFF)

Frequency: 50 kHz, 0.008 $mm_{p-p}$ amplitude

FIG. 8(A) shows a state where the grinding stone and the work are in contact with each other and electrolytic solution is dropped therebetween.

FIG. 8(B) shows a state where the grinding stone is rotated and voltage is applied between the electrodes whereby a small amount of bubbles of hydrogen are generated.

FIG. 8(C) shows a state where the grinding stone is rotated and voltage is applied between the electrodes while high frequency vibration is transmitted to the grinding stone whereby a large amount of bubbles of hydrogen are generated. It is confirmed that electrolytic reaction occurs even when the distance between the electrodes is less than 0.02 mm or when the electrodes are in contact with each other.

Figure 9:
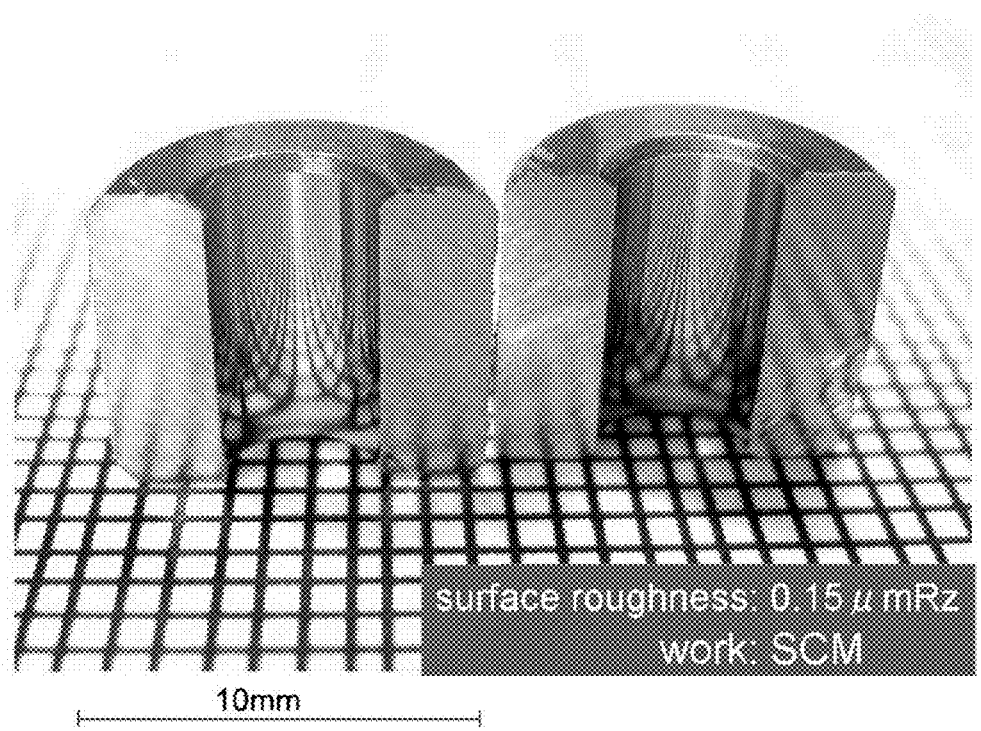
FIG. 9 is an explanatory view showing a mirror finished inner surface of a work which has been grinded in the high-frequency-vibration-assisted electrolytic grinding method according to the present invention.

FIG. 9 illustrates the effect of the high-frequency-vibration-assisted electrolytic grinding method according to the present invention. Shown in the figure is a photograph of a cylindrical work made of chromium molybdenum steel (SCM) which is cut in two for observation after being processed by the high-frequency-vibration-assisted electrolytic grinding method according to the present invention. It is confirmed that the inner surface of the work is mirror finished as it reflects clear images.

The present invention enables it to perform electrolytic grinding even in case the distance between the electrodes is small with the assistance of high frequency vibration. It is an advantageous effect of the present invention that removal of the materials and the chips is efficiently performed and clogging of the grinding stone is prevented. It is also an advantageous effect of present invention that the reactive oxygen generated by collapse of the bubbles (cavitations) can be utilized.

The cavitations generated by ultrasonic waves have concentrated energy in the course of adiabatic compression process such that the collapse of the cavitations generate localized fields having temperature of five thousand to tens of thousands degrees Celsius and pressure of one thousand and several hundreds atm. In the field of high temperature reaction generated by the collapse of the cavitations which occurs when ultrasonic waves are irradiated on water or aqueous solution, water molecules are decomposed to generate OH radicals. It is considered that the highly oxidative OH radicals act effectively on the induction of electrolytic reaction although the oxidative OH radicals dissipate in a short time after being generated.

INDUSTRIAL APPLICABILITY

The high-frequency-vibration-assisted electrolytic grinding method according to the present invention can be utilized in the industries of precision grinding of various metal materials.

EXPLANATION OF REFERENCE NUMERALS 1 high-frequency-vibration-assisted electrolytic grinding device
2 grinding stone
3 grinding stone spindle
4 high-frequency-vibrating means
5 electrolysis-power supply means
6 regulating means
7 abrasive grain
8 conductive binding material
9 electrolytic solution
10 electrolytic products
W work

What is claimed is:
1. A high-frequency-vibration-assisted electrolytic grinding method, the method comprising:
grinding a work with a grinding stone while an electrolytic reaction is performed by applying a voltage between the grinding stone and the work through an electrolytic solution while a high-frequency vibration is transmitted to at least one of the grinding stone and the work in a direction that is axial to the grinding stone, wherein;
the grinding stone has non-conductive micro abrasive grains with grain sizes of less than #400 in accordance with the JIS 6001 standard of grinding stones for precision polishing projecting from its surface, which comprises a conductive binding material, and a distance between the grinding stone and the work, which is regulated by a projecting length of the micro abrasive grains extending from a base of the grinding stone, is set to less than 0.02 mm.

2. The method of claim 1, further comprising:
applying a pulse current having a duty ratio of 5 to 50% between the grinding stone and the work such that an average voltage between the grinding stone and the work is set between 1 and 10V.

3. A high-frequency-vibration-assisted electrolytic grinding device comprising:
a grinding stone having non-conductive micro abrasive grains with grain sizes of less than #400 in accordance with the JIS R6001 standard of grinding stones for precision polishing projecting from its surface, which comprises a conductive binding material;
a vibrator to transmit high-frequency vibration to at least one of the grinding stone and a work, wherein the high-frequency vibration is transmitted in an axial direction of the grinding stone;
a holding mechanism that is configured to hold the work in a position such that a portion of the grinding stone extends into an opening in the work when the high-frequency vibration is transmitted in the axial direction of the grinding stone; and
an electrolysis regulator to perform electrolytic grinding by applying a voltage between the grinding stone and the work through an electrolytic solution, wherein
the device is configured to perform electrolytic grinding while transmitting the high-frequency vibration to at least one of the grinding stone and the work so as to induce or promote an electrolytic reaction between the grinding stone and the work when a distance between the grinding stone and the work, which is regulated by projecting lengths of the micro abrasive grains from a base of the grinding stone, is set to less than 0.02 mm.

4. The method of claim 2, wherein the average voltage between the grinding stone and the work is set less than 4V.

5. The method of claim 2, wherein the average voltage between the grinding stone and the work is set between 5V and 10V.

6. The method of claim 1, wherein the high-frequency vibration has a frequency of 20 kHz or more.

7. The device of claim 3, wherein the holding mechanism comprises a main shaft that is configured to chuck the work and to move the work in a cutting direction of the grinding stone.

8. A high-frequency-vibration-assisted electrolytic grinding method, the method comprising:
grinding a work with a grinding stone while an electrolytic reaction is performed by applying a voltage between the grinding stone and the work through an electrolytic solution while a high-frequency vibration is transmitted to at least one of the grinding stone and the work in a direction that is axial to the grinding stone and while a portion of the grinding stone is inserted into an opening in the work, wherein;
the grinding stone has non-conductive micro abrasive grains with grain sizes of less than #400 in accordance with the JIS R6001 standard of grinding stones for precision polishing projecting from its surface, which comprises a conductive binding material, and
a distance between the grinding stone and the work, which is regulated by a projecting length of the micro abrasive grains extending from a base of the grinding stone, is set to less than 0.02 mm.

9. The method of claim 8, further comprising:
applying a pulse current having a duty ratio of 5 to 50% between the grinding stone and the work such that an average voltage between the grinding stone and the work is set between and 10V.

10. The method of claim 9, wherein the average voltage between the grinding stone and the work is set less than 4V.

11. The method of claim 9, wherein the average voltage between the grinding stone and the work is greater than 5V.

12. The method of claim 9, wherein the average voltage between the grinding stone and the work is set between 5V and 10V.

13. The method of claim 1, wherein the high-frequency vibration has a frequency of 20 kHz or more.

* * * * *